US010212265B2

(12) United States Patent
Gerlach

(10) Patent No.: US 10,212,265 B2
(45) Date of Patent: Feb. 19, 2019

(54) PROCESS FOR WIRELESS CONNECTION OF MOBILE DEVICES

(71) Applicant: VOLKSWAGEN AG, Wolfsburg (DE)

(72) Inventor: Simon Gerlach, Meine (DE)

(73) Assignee: VOLKSWAGEN AG (DE)

( * ) Notice: Subject to any disclaimer, the term of this patent is extended or adjusted under 35 U.S.C. 154(b) by 147 days.

(21) Appl. No.: 15/255,908

(22) Filed: Sep. 2, 2016

(65) Prior Publication Data
US 2017/0070602 A1    Mar. 9, 2017

(30) Foreign Application Priority Data

Sep. 4, 2015    (DE) .................. 10 2015 217 002

(51) Int. Cl.
| H04M 1/60 | (2006.01) |
| H04W 4/02 | (2018.01) |
| H04M 1/725 | (2006.01) |
| H04W 76/10 | (2018.01) |

(52) U.S. Cl.
CPC ....... H04M 1/6091 (2013.01); H04M 1/6075 (2013.01); H04M 1/7253 (2013.01); H04W 4/023 (2013.01); H04W 76/10 (2018.02); H04M 1/72569 (2013.01); H04M 1/72572 (2013.01)

(58) Field of Classification Search
CPC ............. H04M 1/6091; H04M 1/6075; H04M 1/7253; H04W 76/10; H04W 4/023

USPC ........................................................ 370/328
See application file for complete search history.

(56) References Cited

U.S. PATENT DOCUMENTS

| 9,955,331 | B2 * | 4/2018 | Hrabak .................. H04W 4/80 |
| 2004/0038661 | A1 | 2/2004 | Luy et al. |
| 2007/0238491 | A1 | 10/2007 | He |
| 2008/0039018 | A1 | 2/2008 | Kim |
| 2013/0151111 | A1 | 6/2013 | Skelton |
| 2015/0177362 | A1 * | 6/2015 | Gutierrez .............. B60R 25/245 |
| | | | 701/519 |

FOREIGN PATENT DOCUMENTS

| DE | 102005048427 B3 | 5/2007 |
| DE | 102008028975 A1 | 12/2009 |
| DE | 102009054253 A1 | 5/2011 |
| DE | 102014005945 A1 | 10/2014 |
| EP | 1259052 A2 | 11/2002 |

* cited by examiner

Primary Examiner — Christopher R Crompton
(74) Attorney, Agent, or Firm — Barnes & Thornburg LLP

(57) ABSTRACT

A device for a vehicle for setting up a wireless communication link to a mobile apparatus. The device includes a radio device and detects time periods during which a respective mobile apparatus from group of mobile apparatuses is located within range of the radio device for setting up the wireless communication link. The device detects the respective time period for each of the mobile apparatuses within range. The device sets up the wireless communication link to at least one mobile apparatus as a function of the detected time periods.

16 Claims, 1 Drawing Sheet

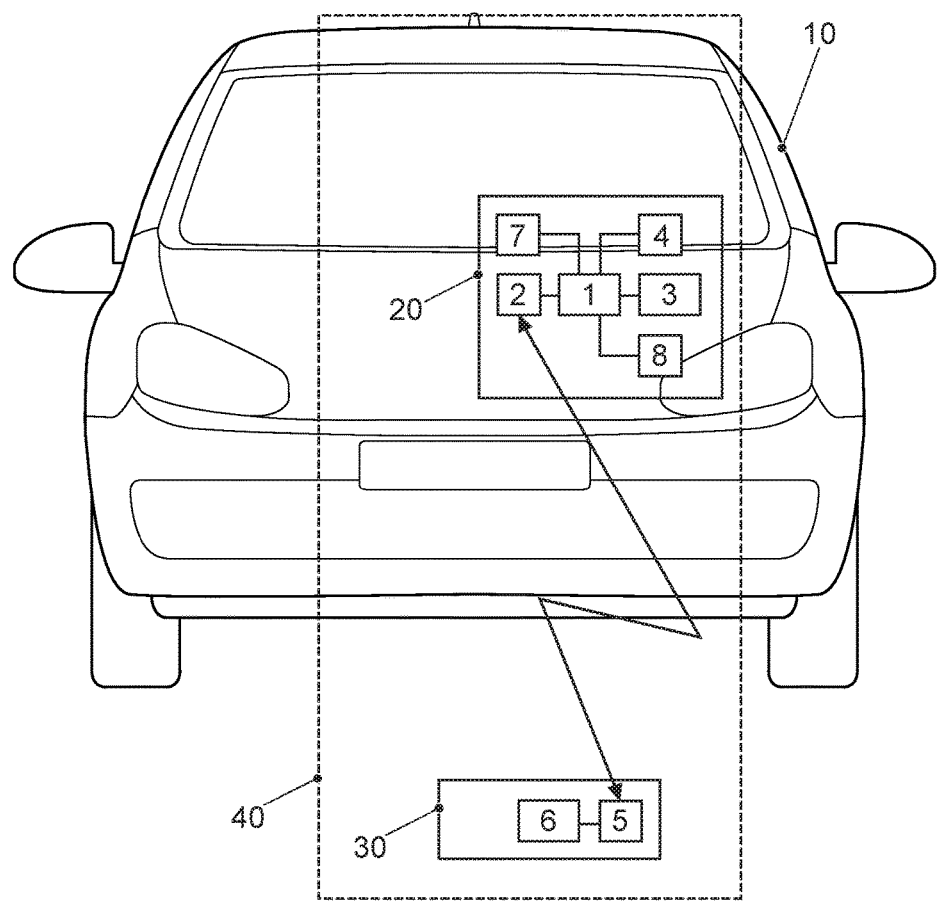

PROCESS FOR WIRELESS CONNECTION OF MOBILE DEVICES

PRIORITY CLAIM

This patent application claims priority to German Patent Application No. 10 2015 217 002.0, filed 4 Sep. 2015, the disclosure of which is incorporated herein by reference in its entirety.

SUMMARY

Illustrative embodiments relate to a device for a vehicle for setting up, with this device, a wireless communication link between a mobile apparatus and the device, and therefore the vehicle.

BRIEF DESCRIPTION OF THE DRAWINGS

Disclosed embodiments will be described in detail with reference to the figure.

FIG. 1 shows in schematic form a disclosed vehicle with a disclosed device.

DETAILED DESCRIPTION

US 2007/0238491 A1 describes a system and a method for setting up a wireless link between apparatuses and a vehicle. In this context, in the event of a plurality of active wireless telephones being located within the radio range of the vehicle, the driver of the vehicle is determined on the basis of the history stored for various users and a wireless link to the vehicle is set up using the driver's telephone.

DE 10 2014 005 945 A1 discloses the transmission of information to a terminal to couple a plurality of terminals to a motor vehicle.

DE 10 2008 028 975 A1 describes a motor vehicle. If a plurality of terminals are available in this motor vehicle, that terminal which was the last to be connected to the vehicle is firstly connected to the vehicle. If a plurality of terminals are coupled, a hands-free device compiles a list of coupled terminals in order with the terminal connected last in the first position.

DE 10 2009 054 253 A1 describes the use of a mobile terminal in a vehicle. In this context, a group of mobile terminals which are able to be coupled to the vehicle via a communication link is determined. This group of mobile terminals is displayed on an operator control unit, and a user selection is detected, to set up a wireless communication link between the selected mobile terminal and a communication device of the vehicle.

For the users of motor vehicles it is increasingly important to connect or couple their mobile apparatuses, in particular, smartphones, to systems of the vehicle, in particular, to the infotainment system of the vehicle. While setting up a cable-bound link between the mobile apparatus and the respective system of the vehicle presents no problem to most users, setting up a wireless link between a mobile apparatus and the vehicle constitutes a considerable challenge for many users.

Disclosed embodiments simplify the setting up of a wireless communication link between a vehicle and a mobile apparatus. Disclosed embodiments provide a device.

A device for a vehicle for setting up a wireless communication link to a mobile apparatus is made available. In this context, the device comprises radio means. The device is configured to detect (e.g., to measure), for example, using time measuring means of the device, time periods or time intervals during which a respective mobile apparatus from a plurality of mobile apparatuses is located within range of the radio means for setting up a wireless communication link. In this context, the device detects, for each of these mobile apparatuses within the range, the respective time period during which the respective mobile apparatus is located within range of the radio means. The device is also configured to set up the wireless communication link to one or more mobile apparatuses as a function of the previously detected time periods (in particular, automatically).

A wireless communication link can be understood to be a Bluetooth link or a WLAN link. A mobile apparatus is understood to be not only a smartphone but also a normal cell phone, a laptop, a tablet computer or else a wireless loudspeaker, an audio system or a television. A first mobile apparatus can be coupled, e.g., to a hands-free system of the vehicle, while a second mobile apparatus can be coupled to a music system of the vehicle. In other words, a plurality of mobile apparatuses can simultaneously have a wireless communication link to the device or to the vehicle, wherein as a rule just one mobile apparatus is coupled per function (e.g., hands-free system, data modem, music system etc.).

In particular, automatic setting up of the wireless communication link between the mobile apparatus and the device, and therefore the vehicle, greatly simplifies the setting up of the wireless communication link. Since with this setting up of the wireless communication link the time periods during which the respective mobile apparatus is located within range of the radio means of the device are taken into account the wireless communication link may be set up with that mobile apparatus which was within range of the vehicle most frequently or for the longest time.

According to a first disclosed embodiment, the disclosed device is configured to determine a first set of the mobile apparatuses as a function of the detected time periods. In this context, each mobile apparatus which is located within range of the vehicle and for which the respective time periods which are detected for this mobile apparatus (for example, in total) exceed a first threshold value, is an element of the first set. The device is configured to set up the wireless communication link automatically (i.e., without any user input) to one mobile apparatus or else with a plurality of mobile apparatuses from the first set.

According to a second disclosed embodiment, the disclosed device is configured to detect various positions of the vehicle, for example, by means of a GPS sensor of the device or of the vehicle, to detect or to determine for each position and the respective mobile apparatus which is located at the respective position in the radio range of the vehicle, not only the time period but also the number of these various positions for the respective mobile apparatus. In this disclosed embodiment, the device is configured to set up the wireless communication link to the at least one mobile apparatus as a function of this number detected per mobile apparatus (in addition to the criterion of the time periods).

As a result of this determination of the different positions of the vehicle at which the respective mobile apparatus was located within range of the radio means of the device, the mobile apparatus with which the wireless communication link to the vehicle is then ultimately set up (in particular, automatically) and may also be determined as a function of the number of positions at which this mobile apparatus was located within range of the vehicle. As a result, a wireless communication link may be set up, for example, with an otherwise comparable total of totaled time periods, to that mobile apparatus which was coupled to the vehicle at more positions.

As has already been described above, a total for each mobile apparatus is determined, in particular, as a function of the detected time periods for each mobile apparatus. The at least one mobile apparatus with which the wireless communication link is set up (in particular, automatically) to the vehicle is then determined as a function of this total.

For example, the total for each mobile apparatus can be calculated by virtue of the fact that time periods in which the respective mobile apparatus was located within range of the vehicle are totaled for each mobile apparatus.

In this context, the disclosed device can be configured to divide the total of the respective mobile apparatus by a predetermined factor (>1) at regular time intervals (e.g., after each predetermined period of operating time (for example, after each hour of operating time)) of the vehicle or else whenever the vehicle starts.

By means of this disclosed embodiment, aging of the time periods is taken into account during the determination of the total of the respective mobile apparatus. This prevents a wireless communication link being set up to the vehicle, also prioritized, for mobile apparatuses which were earlier used frequently in the vehicle but are currently no longer used.

A further possible way of taking into account the aging of the time periods during the determination of the total of the respective mobile apparatus is to consider, for the calculation of the respective total, only the time periods which are within a predetermined time window, wherein the time window ends with the current point in time. As a result, for example, only time periods within this predetermined time window (for example, within the last month) are taken into account for the determination of the total of the respective mobile apparatus.

According to a further disclosed embodiment, the number of different positions at which the respective mobile apparatus was located within range of the vehicle is taken into account by increasing the total of the respective mobile apparatus by an additional time period which is longer the larger this number of different positions for the respective mobile apparatus.

In this disclosed embodiment, the time periods and the number of different positions are taken into account on the basis of a value (of the total), as a result of which sorting can be relatively easily carried out on the basis of this value (of the total).

In the text which follows, disclosed embodiments are described in which the mobile apparatus is selected using a list displayed on a display of the device and is then used to set up a wireless communication link to the vehicle.

According to a first of these disclosed embodiments, the device forms a first set and a second set of mobile apparatuses. In this context, each mobile apparatus which is currently located within the radio range of the vehicle forms part of the first set. Each mobile apparatus for which a wireless communication link has been set up to the device or to the vehicle at least once forms part of the second set. The device displays the list of mobile apparatuses on its display in the following order:

firstly those mobile apparatuses from the first set for which the respective total of the time periods is larger than a predetermined total threshold value are displayed,
subsequently, those mobile apparatuses from the first set which are not yet displayed on the list are displayed.
The list excludes those mobile apparatuses from the second set which are not additionally in the first set.

The device is configured here to detect a selection of a mobile apparatus, in particular, by an occupant of the vehicle, on the basis of the displayed list, to set up the wireless communication link to the selected mobile apparatus.

By virtue of the fact that those mobile apparatuses are displayed first in the list which are, on the one hand, currently located within the radio range of the vehicle and for which, on the other hand, the calculated total of the time periods is larger than the predetermined total threshold value, the mobile apparatuses which are probably most relevant from the point of view of the driver of the vehicle are located at the start of the list.

According to a second disclosed embodiment, the disclosed device also creates a first and a second set. In contrast to the previously described embodiment, a mobile apparatus which currently has a wireless communication link to the vehicle does not form part of the second set. According to this second disclosed embodiment, those mobile apparatuses which form part both of the first set and of the second set and for which the total of the time periods is larger than a predetermined further total threshold value are located first on the list.

Subsequently, those mobile apparatuses which form part both of the first set and of the second set but are not yet displayed on the list are displayed on the list. As in the first disclosed embodiment, the device in the case of the second disclosed embodiment is configured, on the one hand, to detect a selection of a mobile apparatus from the displayed list and, on the other hand, to set up the wireless communication link to the selected mobile apparatus.

The second disclosed embodiment is present for coupling the infotainment system of the vehicle, instead of the currently coupled mobile apparatus, quickly to another mobile apparatus. The further total threshold value can correspond here to the total threshold value of the first disclosed embodiments.

In this second disclosed embodiment, the list of the mobile apparatuses which form part both of the first set and of the second set can additionally have those mobile apparatuses which form part of the first set and for which the total of the time periods is larger than another total threshold value and which are not yet present on the list. Subsequently those mobile apparatuses which form part of the first set and have previously not yet been listed are displayed on the list.

An adaptation of the second disclosed embodiment ensures that all the mobile apparatuses which form part of the first set (that is to say are currently within radio range of the vehicle) are present on the list. In this context, the other total threshold value can correspond to the further total threshold value.

Every mobile apparatus is displayed in such a way on the list which is displayed according to any disclosed embodiment on the display of the device that it is possible to infer from the display of the respective mobile apparatus whether the respective mobile apparatus forms part of the first set, of the second set or of the first and the second set. Moreover, it can be inferred from the display of every mobile apparatus on the list whether the respective mobile apparatus does not belong to the first set, does not belong to the second set or belongs neither to the first set nor to the second set. For example, the mobile apparatuses which do not form part of the first set (i.e., which are not currently located within the radio range of the vehicle) can be correspondingly marked (e.g., displayed in grey) and are displayed in such a way that they cannot be selected. Mobile apparatuses which have not yet been coupled to the device (that is to say are not an element of the second set) can be characterized as new.

Moreover, the number of entries in the list can be limited to a predefined number to display only the most relevant mobile apparatuses. Optionally, all the entries can then be displayed at the request of the user.

According to the disclosed embodiments, it is also possible to firstly try automatically to set up a wireless communication link to those mobile apparatuses whose total is below the predetermined total threshold value. As a result, those mobile apparatuses which have been located within range for only a short time (that is to say are relatively new) are prioritized.

Disclosed embodiments also provide a system which comprises a disclosed device and a mobile apparatus.

Finally, disclosed embodiments provide a vehicle which comprises a disclosed device.

Disclosed embodiments are suitable for motor vehicles. Of course, the disclosed embodiments are not limited to this range of application since the disclosed embodiments can also be used in the case of ships, aircraft and rail-bound or track-bound vehicles. In a certain way, the disclosed embodiments can even be used with stationary objects (for example, to set up a wireless communication link between a mobile apparatus and a stationary device).

In the single figure, a vehicle 10 which comprises a device 20 is illustrated in schematic form. The device 20 itself comprises in addition to a controller 1 a radio device 2, a display 3, a memory 4, a timer 7 and a GPS sensor 8. The radio device 2 is equipped to set up a wireless communication link to a radio device 5 of a mobile apparatus 30 (e.g., of a smartphone). The mobile apparatus 30 comprises a controller 6 in addition to the radio device 5. Finally, a disclosed system which comprises the device 20 and the mobile apparatus 30 is denoted by the reference sign 40.

The device 20 continuously scans mobile apparatuses 30 which are located within the radio range of the radio device 2. The mobile apparatuses 30 which are currently located within this range are added to a set A. The total of the time periods during which the respective mobile apparatus was within range is determined for all the mobile apparatuses which were located within range once at any time. In this context, a specific supplement is added to the total if the respective mobile apparatus 30 was at different locations in the vehicle within the range, which is detected using the GPS sensor 8. Mobile apparatuses 30 which were located within the range of the vehicle over a relatively long time and which are currently also located within the range of the vehicle 10 (to be more precise the range of the radio device 2) are added to a set B. Mobile apparatuses for which a wireless communication link was set up to the device 20 or to the vehicle 10 at least once are elements of a set C. The time period during which a mobile apparatus 30 was within the range of the radio device 2 is measured with the timer 7. Any time period can be stored at least for a short time in the memory 4. Furthermore, any time period can also be added to the respective total of the associated mobile apparatus, which total is stored in the memory 4.

The set A corresponds to the previously described first set, while the set C corresponds to the previously described second set.

If no mobile apparatus 30 is currently coupled to the device 20 (e.g., the infotainment system of the vehicle 10), it is firstly tried to set up automatically a wireless communication link to mobile apparatuses 30 which are located in the intersection set of the set B and the set C. In this case, a communication link to the mobile apparatus from the intersection set which was last coupled to the device 20 may be set up automatically. If these attempts to set up a wireless communication link were not successful, it is tried to set up automatically a wireless communication link to mobile apparatuses 30 which are located in the intersection set of the set A and the set C. An attempt may be made again to set up automatically a communication link to the mobile apparatus from the intersection set which was last coupled to the device 20.

If this automatic setting up of a wireless communication link was not successful, a list of mobile apparatuses 30 is displayed on the display 3 which has the following order:
1. The mobile apparatuses 30 which are elements of the set B.
2. The mobile apparatuses 30 which are elements of the set A but are not elements of the set B.
3. The mobile apparatuses 30 which are elements of the set C but are not elements of the set A. These mobile apparatuses 30 are displayed on the list, each able to be differentiated from the rest of the mobile apparatuses which are illustrated since they are currently not located within range.

For example, the driver of the vehicle 10 can select a mobile apparatus 30 from the displayed list and as a result cause a wireless communication link to be set up to this mobile apparatus 30 by the device 20.

In the event of a wireless communication link being already currently present between the device 20 and a mobile apparatus 30, the following list can be displayed on the display 3 to change over quickly to another mobile apparatus in the following order. In this context, the set D corresponds to the set C without the mobile apparatus being currently coupled.
1. The mobile apparatuses 30 which are both elements of the set B and elements of the set D. These mobile apparatuses 30 were once coupled to the device 20 and have already been located within range of the device 20 for a long time.
2. The mobile apparatuses 30 which are both elements of the set A and elements of the set D but are not elements of the set B. These mobile apparatuses 30 were once coupled to the device 20 and have only been located within range of the device 20 for a short time.
3. The mobile apparatuses 30 which are elements of the set B but not elements of the set D. These mobile apparatuses 30 have never been coupled to the device 20 but have already been located within range for a long time.
4. The mobile apparatuses 30 which are within the set A but not within the set B and not within the set D. These mobile apparatuses 30 have never been coupled to the device 20 and have been located within range for only a short time.
5. The mobile apparatuses 30 which are within the set D but not within the set A and not within the set B. These mobile apparatuses 30 are represented in such a way that they can be differentiated from the rest of the displayed mobile apparatuses since they are not yet located within range.

For example, the driver of the vehicle 10 can select a mobile apparatus 30 from the displayed list to set up a wireless communication link between the device 20 and the selected mobile apparatus 30 instead of the wireless communication link to the mobile apparatus which is currently connected.

LIST OF REFERENCES SIGNS 1, 6 Controller
2, 5 Radio device
3 Display

4 Memory
7 Timer
8 GPS sensor
10 Vehicle
20 Device
30 Smartphone
40 System

The invention claimed is:

1. A device for a vehicle for setting up a wireless communication link to a mobile apparatus,
wherein the device comprises radio,
wherein the device detects time periods during which a respective mobile apparatus from a plurality of mobile apparatuses is located within range of the radio for setting up the wireless communication link, wherein the device detects the respective time period for each mobile apparatus of the plurality within range,
wherein the device sets up the wireless communication link to at least one mobile apparatus as a function of the detected time periods,
wherein the device detects a number of different positions of the vehicle at which the respective mobile apparatus is within range of the vehicle, and
wherein the device sets up the wireless communication link to the mobile apparatus as a function of the detected number.

2. The device of claim 1, wherein the device determines a total as a function of the detected time periods per mobile apparatus and-automatically sets up the wireless communication link to at least one mobile apparatus as a function of the total.

3. The device of claim 1, wherein the device determines a total as a function of the detected time periods per mobile apparatus and the device divides the total of the respective mobile apparatus by a factor which is larger than 1 at regular time intervals or whenever the vehicle starts.

4. The device of claim 1, wherein the device determines a total as a function of the detected time periods per mobile apparatus and the device increases the total of the respective mobile apparatus by an additional time period which is longer the larger the number of different positions for the respective mobile apparatus.

5. The device of claim 1,
wherein the device comprises a display,
wherein the device determines a first set and a second set of mobile apparatuses, wherein each mobile apparatus located within the range of the vehicle forms part of the first set, wherein each mobile apparatus for which a wireless communication link has been set up to the vehicle once forms part of the second set,
wherein the device determines a total as a function of the detected time periods per mobile apparatus,
wherein the device displays a list of mobile apparatuses on the display, wherein the device arranges the list in the following order:
firstly those mobile apparatuses from the first set for which the total is larger than a total threshold value,
subsequently those mobile apparatuses from the first set which are not yet on the list, and
subsequently those mobile apparatuses from the second set which are not yet on the list,
wherein the device detects a selection of a mobile apparatus from the displayed list, and
wherein the device sets up the wireless communication link to the selected mobile apparatus.

6. The device of claim 1,
wherein the device comprises a display,
wherein the device determines a first set and a second set of mobile apparatuses, wherein each mobile apparatus located within the range of the vehicle forms part of the first set, wherein each mobile apparatus for which a wireless communication link to the vehicle has been set up once forms part of the second set, wherein a mobile apparatus for which there is currently a wireless communication link to the device does not form part of the second set,
wherein the device determines a total as a function of the detected time periods per mobile apparatus,
wherein the device displays a list of mobile apparatuses on the display, wherein the device arranges the list in the following order:
firstly those mobile apparatuses which form part both of the first set and of the second set and for which the total is larger than a total threshold value, and
subsequently those mobile apparatuses which form part both of the first set and of the second set but are not yet on the list,
wherein the device detects a selection of a mobile apparatus from the displayed list, and
wherein the device sets up the wireless communication link to the selected mobile apparatus.

7. The device of claim 6,
wherein the device also fills the list of mobile apparatuses on the display in the following order:
according to the mobile apparatuses which form part both of the first set and of the second set, those mobile apparatuses which form part of the first set and for which the total is larger than a further total threshold value and which are not yet listed, and
subsequently those mobile apparatuses which form part of the first set and which are not yet listed.

8. The device of claim 6, wherein the device displays the list on the display such that, for each displayed mobile apparatus, it is possible to determine whether the respective mobile apparatus forms part of the first set and/or second set.

9. A method for setting up a wireless communication link to a mobile apparatus for a vehicle, the method comprising:
detecting time periods during which a respective mobile apparatus from a plurality of mobile apparatuses is located within range of the radio for setting up the wireless communication link;
detecting the respective time period for each mobile apparatus of the plurality within range;
setting up the wireless communication link to at least one mobile apparatus as a function of the detected time periods;
detecting a number of different positions of the vehicle at which the respective mobile apparatus is within range of the vehicle; and
setting up the wireless communication link to the mobile apparatus as a function of the detected number.

10. The method of claim 9, further comprising determining a total as a function of the detected time periods per mobile apparatus and automatically setting up the wireless communication link to at least one mobile apparatus as a function of the total.

11. The method of claim 10, further comprising dividing the total of the respective mobile apparatus by a factor which is larger than 1 at regular time intervals or whenever the vehicle starts.

12. The method of claim 10, further comprising increasing the total of the respective mobile apparatus by an additional time period which is longer the larger the number of different positions for the respective mobile apparatus.

13. The method of claim 10, further comprising:
determining a first set and a second set of mobile apparatuses, wherein each mobile apparatus located within the range of the vehicle forms part of the first set, wherein each mobile apparatus for which a wireless communication link has been set up to the vehicle once forms part of the second set;
displaying a list of mobile apparatuses on a display, wherein the list is arranged in the following order:
firstly those mobile apparatuses from the first set for which the total is larger than a total threshold value,
subsequently those mobile apparatuses from the first set which are not yet on the list, and
subsequently those mobile apparatuses from the second set which are not yet on the list,
wherein the method further comprises detecting a selection of a mobile apparatus from the displayed list, and setting up the wireless communication link to the selected mobile apparatus.

14. The method of claim 10, further comprising:
determining a first set and a second set of mobile apparatuses, wherein each mobile apparatus located within the range of the vehicle forms part of the first set, wherein each mobile apparatus for which a wireless communication link to the vehicle has been set up once forms part of the second set, wherein a mobile apparatus for which there is currently a wireless communication link to the device does not form part of the second set; and
displaying a list of mobile apparatuses on a display, wherein the list is arranged in the following order:
firstly those mobile apparatuses which form part both of the first set and of the second set and for which the total is larger than a total threshold value, and
subsequently those mobile apparatuses which form part both of the first set and of the second set but are not yet on the list,
wherein the method further comprises detecting a selection of a mobile apparatus from the displayed list, and setting up the wireless communication link to the selected mobile apparatus.

15. The method of claim 14, further comprising filling the list of mobile apparatuses on the display in the following order:
according to the mobile apparatuses which form part both of the first set and of the second set, those mobile apparatuses which form part of the first set and for which the total is larger than a further total threshold value and which are not yet listed, and
subsequently those mobile apparatuses which form part of the first set and which are not yet listed.

16. The method of claim 14, wherein for each displayed mobile apparatus, it is possible to determine whether the respective mobile apparatus forms part of the first set and/or second set based on the displayed list.

* * * * *